United States Patent [19]

Spaulding

[11] 3,846,737

[45] Nov. 5, 1974

[54] ELECTRICAL CONNECTOR UNIT FOR LEADLESS CIRCUIT DEVICE

[75] Inventor: Tedford H. Spaulding, Norridge, Ill.

[73] Assignee: Bunker Ramo Corporation, Oak Brook, Ill.

[22] Filed: Feb. 26, 1973

[21] Appl. No.: 335,479

[52] U.S. Cl. ............... 339/174, 339/17 CF, 339/36, 220/42 B, 220/55 K

[51] Int. Cl. ............................................ H01r 13/50

[58] Field of Search ... 339/17 C, 17 CF, 174, 75 M, 339/91 R, 113, 36; 174/DIG. 3; 220/42 B, 55 K; 206/46 ED

[56] References Cited

UNITED STATES PATENTS

| | | | |
|---|---|---|---|
| 3,297,974 | 1/1967 | Pittman | 339/17 CF |
| 3,391,382 | 7/1968 | Leibovitz | 339/17 CF X |
| 3,467,942 | 9/1969 | Dell et al. | 339/91 R X |
| 3,700,788 | 10/1972 | Spurck | 339/17 CF X |
| 3,710,299 | 1/1973 | Weisenburger | 339/17 CF |
| 3,753,211 | 8/1973 | Pauza et al. | 339/17 CF X |
| 3,754,203 | 8/1973 | Pauza et al. | 339/17 CF |
| 3,771,109 | 11/1973 | Bruckner et al. | 339/174 |

*Primary Examiner*—Paul R. Gilliam
*Assistant Examiner*—Lawrence J. Staab
*Attorney, Agent, or Firm*—William Lohff; F. M. Arbuckle

[57] ABSTRACT

An electrical connector unit affording a protective enclosure for a leadless circuit device (usually an integrated circuit) mounted on a flat substrate; the connector comprises a unitary one-piece base defining a receptacle for the device and a plurality of resilient metal contacts, mounted in the base, engaging the substrate of the device and biasing it outwardly of the base receptacle in an upward direction. A unitary one-piece insulator cover is mounted on the base and holds the device in the base receptacle, against the outward bias of the contacts; the cover has key projections at opposite ends that fits into keyways formed in the upper parts of two opposed end walls of the base. The keys and keyways are formed with mating upwardly inclined positioning and retaining surfaces that orient the cover on the base and lock it in place. One key is of resilient construction, releaseable to allow opening of the cover; release is effected by a tool inserted in small cavities in the cover that will not admit a finger or an ordinary screwdriver.

16 Claims, 8 Drawing Figures

ELECTRICAL CONNECTOR UNIT FOR LEADLESS CIRCUIT DEVICE

CROSS REFERENCES TO RELATED APPLICATIONS

The invention to which this application is directed comprises an improvement upon the connector units described and claimed in the co-pending application of Richard Bruckner Et Al Ser. No. 248,869, filed May 1, 1972 which issued Nov. 6, 1973 as U.S. Pat. No. 3,771,109.

BACKGROUND OF THE INVENTION

Integrated circuit devices commonly utilize a construction in which a semiconductor integrated-circuit "chip" is mounted upon an insulator base; a plurality of thin conductive leads project from the base to connect the device to external circuits. One common construction comprises a dual in-line package, in which the leads protrude from opposite sides of the device and are bent at right angles to afford mounting pins for the device. For example, ten leads may extend from each of two opposed sides for a twenty lead device. Devices of this kind are difficult to manufacture, particularly because of the bent leads; breakage of the leads is a major source of trouble and often causes a high rejection rate. The leads may also be broken during testing, shipping, or installation. Since the semiconductor chips are relatively expensive, the problems presented are of a serious nature.

More recently, integrated circuit devices have been developed in which external electrical connections are provided by conductive pads disposed along one surface of a flat insulator substrate on which the device is mounted. In connector units for these devices, the integrated circuit device substrate is clamped between an insulator base and an insulator cover. The base includes a plurality of individual metal contacts, one for each conductive pad on the integrated circuit device; these electrical contacts may be of relatively strong and rigid construction, eliminating the problems associated with external leads in conventional integrated circuit arrangements. The conductive pads may be of substantial size, avoiding unduly stringent requirements for the printed circuit conductors that connect the pads to the semiconductor chip.

Connector units of the foregoing type afford substantial advantages, in comparison with other more conventional connector constructions. In particular, the construction described in the aforementioned co-pending application of Richard Bruckner et al, Ser. No. 248,869 provides for ready and rapid assembly of a connector unit, including its metal contacts, coupled with effective and accurate orientation of the integrated circuit device in the connector unit. On the other hand, it is sometimes difficult to achieve a desirable low profile for the connector unit, particularly when a complete hinge connection is required between the connector unit cover and its face. Moreover, in some prior constructions, there may be a tendency toward loose fitting of the connector unit cover on the connector unit base, with a resulting possibility of poor contact between the conductive pads of the circuit device and the metal contacts in the connector base. Conversely, if a tight fit is provided, there may be a tendency toward "scouring" the conductive pads off the integrated circuit device substrate during assembly or disassembly of the connector unit. Previously proposed connector units also suffer from the disadvantage that they may be readily disassembled by unauthorized personnel, leading to damage to the semiconductor chip, the conductive pads, or the connecting conductors of the integrated circuit device.

SUMMARY OF THE INVENTION

It is a principal object of the invention, therefore, to provide a new and improved electrical connector unit for supporting and completing electrical connections to a leadless integrated circuit device of the kind comprising a thin, flat substrate and a plurality of conductive pads arranged in a predetermined pattern on a substantially planar connection surface of that substrate, which effectively and inherently eliminates or overcomes the problems and difficulties encountered in previously known connectors, as discussed above.

A particular object of the invention is to provide a new and improved electrical connector unit for a leadless circuit device having a thin, flat substrate and a plurality of flat conductive connector pads, which effectively encloses and protects the circuit device and that is of compact construction with an optimumly low profile.

A further object of the invention is to provide a new and improved connector unit for a leadless circuit device incorporating a thin, flat substrate and a plurality of flat conductive connector pads, utilizing an interlocking keyway and key construction for the connector unit cover together with resilient metal contact members to assure a tight, firm, and accurately positioned mounting of the connector unit cover on its base.

Another object of the invention is to provide a new and improved electrical connector unit for a leadless circuit device which utilizes a simple and readily actuated interlock arrangement for mounting a cover on the base of the connector unit, yet which prevents unauthorized access to the device by precluding removal of the cover except with a special tool for actuating a key latch between the cover and the base.

Accordingly, the present invention relates to an electrical connector unit for supporting and for completing electrical connections to a leadless circuit device of the kind comprising a relatively thin, flat substrate and a plurality of conductive pads arranged in a predetermined pattern on a substantially planar connection surface of that substrate. A connector unit constructed in accordance with the invention comprises a unitary one-piece insulator base having walls defining an open-top receptacle for receiving the circuit device, with the walls of the base in close juxtaposition to and locating the device in predetermined position extending across the top of the receptacle. A plurality of individual resilient metal contact members are mounted in the base, one for each conductive pad of the circuit device, each contact member including a terminal element projecting outwardly of the base for connection to an external circuit and an active contact element projecting upwardly into the aforesaid receptacle. The active contact elements of the contact members are arranged in a pattern providing for contact between the contact members and the conductive pads when the circuit device is inserted in the receptacle. The connector unit further comprises a unitary one-piece insulator cover for closing the top of the receptacle to enclose the circuit device in the receptacle. The cover includes two key projections extending outwardly of opposed ends thereof, each key projection having an upwardly inclined positioning surface. The cover also has an elongated slot extending parallel to one edge closely adjacent one of the key projections to form, with that key projection, a releasable latch. Two keyways are formed in the upper edges of opposed walls of the base above the adjoining inserted device, for receiving the key projections on the cover; each keyway has an upwardly inclined retaining surface comple mentary to and engageable with the positioning surface of one of the key projections. The resilient contact members bias the circuit device and the cover upwardly outwardly of the receptacle, when the connector unit is fully assembled with the circuit device inserted in the receptacle,, to force the inclined positioning surfaces of the key projections into snug engagement with the inclined retaining surfaces of said keyways and thereby lock the connector unit cover firmly and accurately in place over the circuit device.

DESCRIPTION OF THE PREFERRED EMBODIMENT

Figure 1:
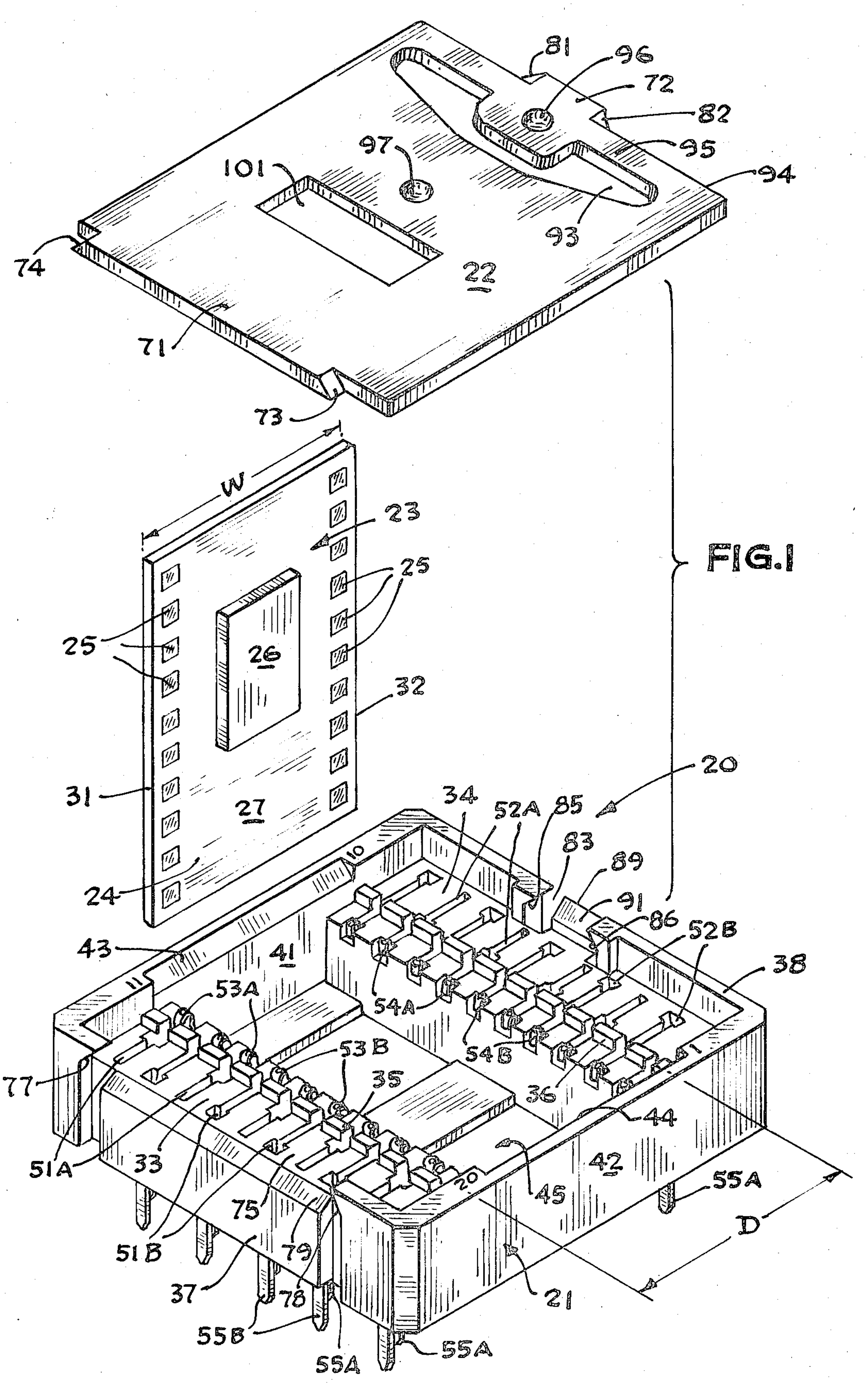
FIG. 1 is an exploded isometric view, larger than actual size, of an electrical connector unit constructed in accordance with one embodiment of the present invention, in disassembled condition.
Figure 2:
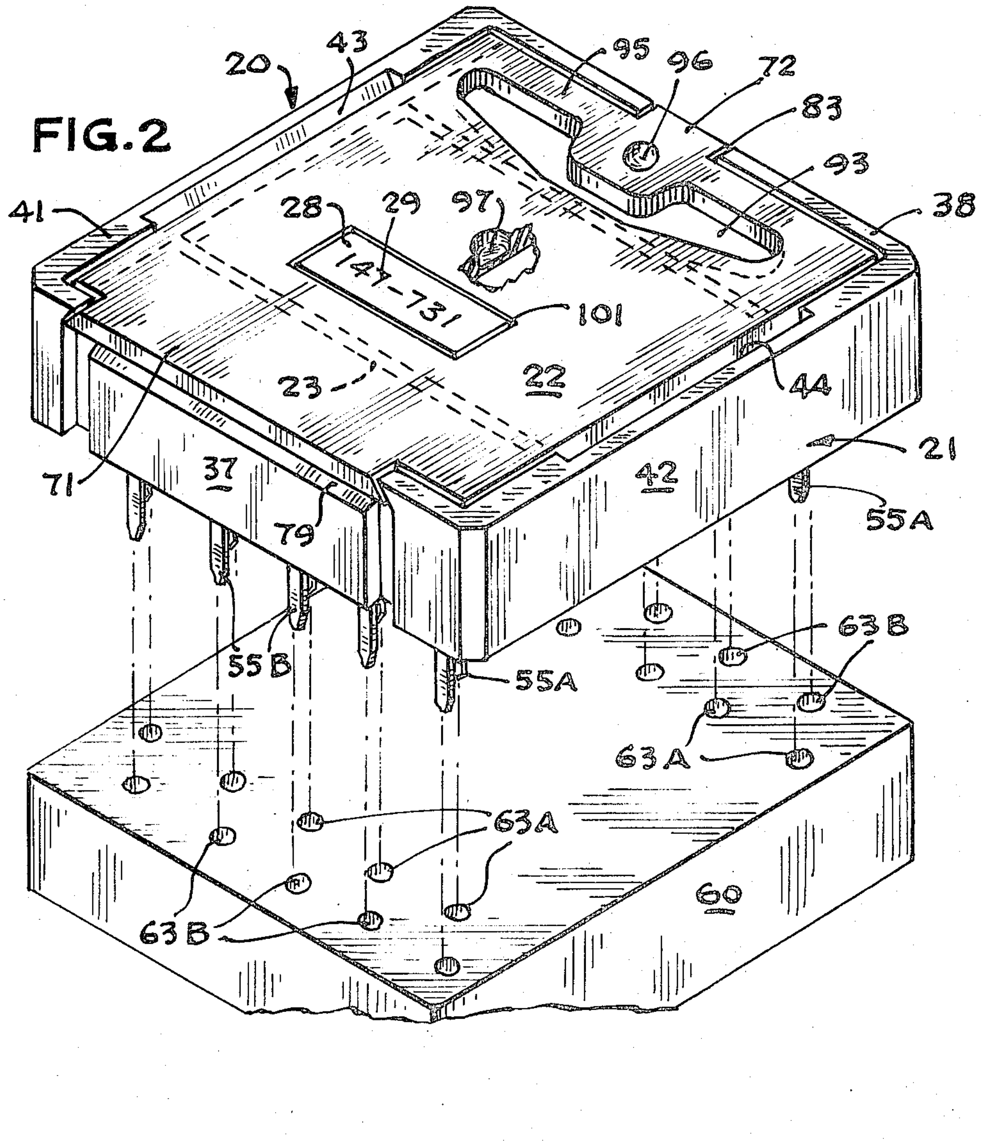
FIG. 2 is an isometric view of the connector unit of FIG. 1, in assembled condition, aligned with a mating connector unit.

The electrical connector unit 20 that is illustrated in open disassembled condition in FIG. 1 and in closed assembled condition in FIG. 2 includes a unitary, one-piece insulator base 21 and a unitary, one-piece insulator cover 22. Connector unit 20, which comprises a preferred embodiment of the present invention, is utilized for supporting and for completing electrical connections to a circuit device 23. When device 23 is mounted in the base 21 of connector unit 20, and cover 22 is mounted on the base as shown in FIG. 2, device 23 is almost completely enclosed and is substantially fully protected.

Base 21 is a single, one-piece molded resin member; the resin is selected to afford reasonable strength and resiliency as well as affording adequate insulator properties. Suitable resins include nylon, glass-filled nylon, and the aliphatic polysulphones. Similarly, cover 22 is a molded one-piece resin member, the resin again being selected to provide adequate strength and resiliency.

As best shown in FIG. 1, the circuit device 23 comprises a thin, flat insulator support or substrate 24. Although other materials may be utilized, the insulator substrate 24 is usually formed of ceramic material. A plurality of electrically conductive pads 25 are arranged in a predetermined pattern on one surface 27 of the substrate 24. In the illustrated construction, the conductive pads 25 are equally spaced along two sides of the substrate surface 27, adjacent the side edges 31 and 32 of substrate 24. Surface 27 of substrate 24, sometimes referred to hereinafter as the connection surface of circuit device 23, is a closely controlled, flat, planar surface.

An integrated-circuit semiconductor chip 26 is mounted on the central portion of the connection surface 27 of device 23. The semiconductor chip 26 is electrically connected to the conductive pads 25 by appropriate conductors extending across the connection surface 27. The pattern and arrangement of the conductors may vary to a substantial extent, depending upon the nature of the integrated-circuit chip 26; accordingly, the connecting conductors have not been shown in the drawing. On the reverse surface 28 of substrate 24 (FIG. 2), opposite the connection surface 27, an identification legend 29 is imprinted or otherwise applied to the circuit device 23. Legend 29 is not centered on the reverse surface 28 of substrate 24; instead, it is located to one side of the substrate surface 28 to provide for effective orientation of circuit device 23 in base 21 of connector unit 20, as described more fully hereinafter.

As noted above, the insulator base 21 of connector unit 20 is formed as a one-piece unitary molded member; base 21 may be molded from a plastic resin material such as glass-reinforced nylon, although other suitable materials may be utilized as desired. As shown in FIG. 1, base 21 includes an internal shoulder or ledge 33 extending along one end wall 37 of the base. A locating wall 35 extends across the top of ledge 33, parallel to but spaced internally from the outer wall 37 of base 21. The overall height of the allocating wall 35 should be equal to or less than the thickness of the substrate 24 of ciurcuit device 23. The opposite end of base 21 is of similar construction, and includes an internal shoulder ledge 34 extending for the full length of the end wall 38 of base 21. A locating wall 36 extends across the top of the ridge 34, parallel to but spaced inwardly from wall 38. The distance D between the two locating walls 35 and 36 should be approximately equal to or very slightly larger than the width W of the substrate 24 for device 23.

One side wall 41 of the insulator base 21 includes an internal downwardly included guide surface 43. The overall length of the inclined guide surface 43 is equal to the spacing between the internal locating walls 35 and 36 and hence is approximately equal to or slightly larger than the width W of the circuit device substrate 44. At the opposite side wall 42 of base 21, there is a similar downwardly incline guide surface 44 that also extends for the full width W of device 23. The inner locating walls 35 and 36, conjointly with the guide surface 43 and 44 of the end walls 41 and 42, define the perimeter of an open-top receptacle 45. Walls 35, 36, 41 and 42 are disposed in close juxtaposition to and serve to locate device 23 in predetermined position extending across the top of the receptacle 45 when the device 23 is assembled in connector unit 20.

Throughout this specification, and in the appended claims, directional terms such as "upwardly", "downwardly", and the like refer to the particular orientation of connector unit 20 shown in the drawings. It should be understood, however, that this terminology is employed only for convenience in description. Connector unit 20 can be mounted in virtually any desired orientation, even upside down if necessary, once it has been assembled.

Within base 21 of connector unit 20 there are a plurality of contact cav ities 51A alternating with similar but specifically different contact cavities 51B in a pattern that extends along one end of base 21 adjacent the end wall 37.(FIG. 1) Each of the contact cavities 51A and 51B extends downwardly through the ledge 33 and its locating wall 35. A plurality of individual conductive metal contact members 53A are mounted in the contact cavities 51A; each contact member 53A is inserted downwardly into one of the cavities 51A and projects downwardly outwardly of base 21 as shown in FIG. 4.

A series of individual conductive metal contact members 53B are similarly mounted in the contact cavities 51B. Adjacent the opposite end wall 38 of base 21, as shown in FIG. 1, there are a plurality of individual contact cavities 52A in ledge 34, similar to the contact cavities 51A, that alternate with a series of contact cavities 52B corresponding in configuration to the contact cavities 51B. Individual conductive metal contacts 54A and 54B are mounted in cavities 52A and 52B, respectively.

Figure 4:
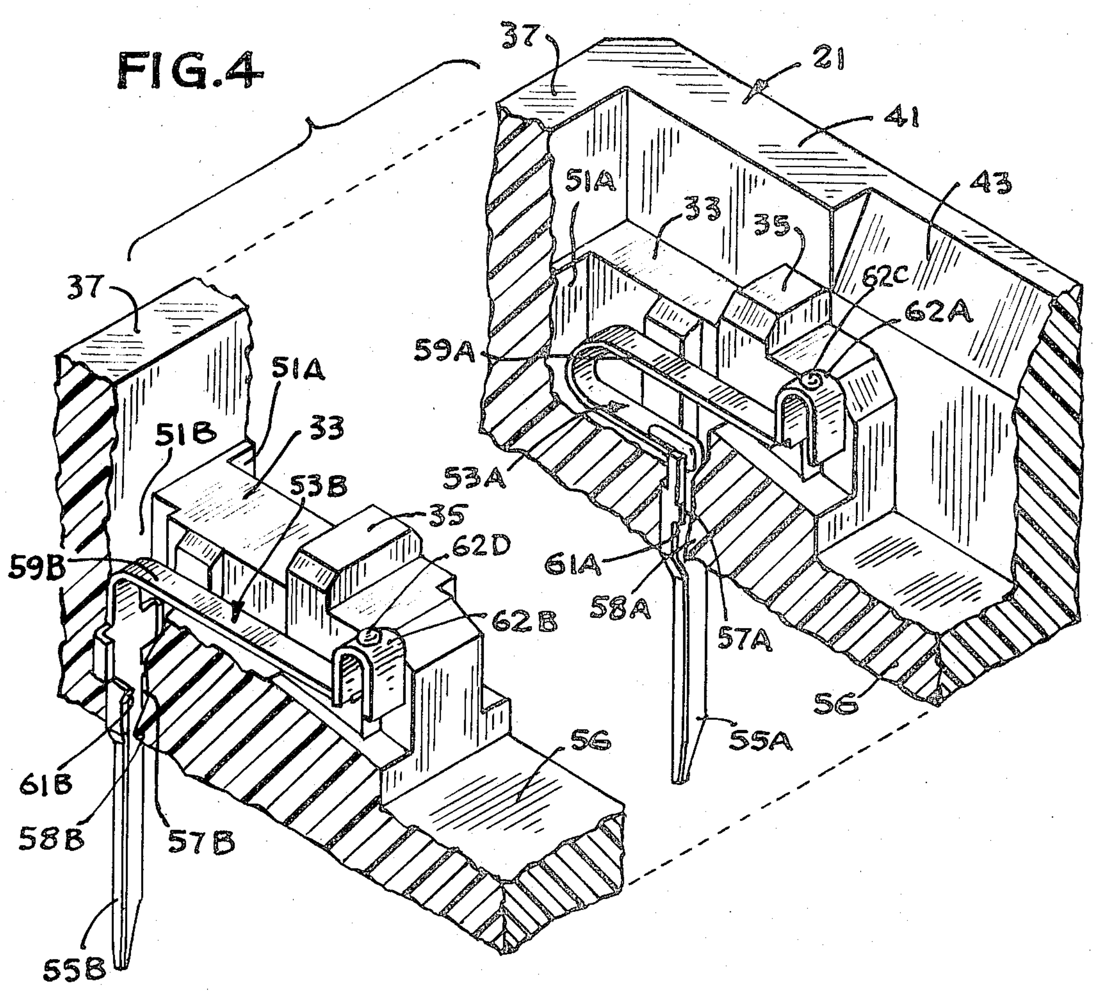
FIG. 4 is a detail isometric view, drawn to a larger scale than the preceding figures, of a part of the connector base, cut away to show two forms of metal contact members employed in the connector.

As shown in FIG. 4, the bottom of each contact cavity 51A communicates with a relatively narrow channel 57A that extends downwardly through the bottom wall 56 of base 21. A projection 58A extends into the channel 57A, at the bottom of the channel. The metal contact member 53A mounted in cavity 51A is of one-piece construction and includes an integral shank or pin segment 55A, constituting a terminal element for connection to an external circuit. Terminal element 55A extends downwardly through channel 57A and projects downwardly beyond the bottom wall 56 of base 21 for a substantial distance. The terminal element 55A of contact member 53A is generally U-shaped in cross section, affording a relatively rigid pin which fits around projection 58A so that projection 58A serves to orient terminal element 55A. A barb or spur 61A may be found on terminal element 55A to anchor the terminal element in channel 57A of base 21.

The upper part of contact member 53A comprises a cantilever spring arm 59A that terminates, at its free end, in an integral active contact element 62A. The active contact element 62A extends well above the upper surface of ledge 33 when contact member 53A is in unstressed condition, and may include a precious metal tip 62C.

One contact cavity 51B and the related one-piece contact member 53B are also shown in FIG. 4. The outer lower end of cavity 51B extends into a narrow channel 57B having a projection 58B at the bottom of the channel. Projection 58B fits into a U-shaped pin 55B that is an integral part of member 53B. An anchor projection or spur 61B may be formed on the contact member 53B. The upper part of contact member 53B comprises a cantilever leaf spring arm 59B that terminates, at its free end, in an upwardly projecting active contact element 62B having a contact tip 62D. Contact element 62B, like contact element 62A, projects substantially above the upper surface of the ledge 33 in base 21. The cantilever spring arms 59A and 59B each extend approximately parallel to but spaced from the connection surface 28 of substrate 24 (FIG. 1) when device 23 is mounted in connector unit 20; however, substantial deviation from a parallel relation can be tolerated. As is apparent from FIG. 4, the principal difference between the contact members 53A and 53B is the positioning of their terminal elements 55A and 55B relative to the end wall 37 of the insulator base 21. The terminal element 55A of each contact member 53A is spaced inwardly of wall 37 by an appreciable distance, whereas the similar terminal element 55B of contact member 53B is located immediately adjacent the inner surface of wall 37. This affords a staggered pattern for the terminal elements or pins 55A and 55B, as most clearly indicated by the pattern of the sockets 63A and 63B into which the terminal elements fit when the connector unit 20 is employed in conjunction with a mating connection unit 60, as shown in FIG. 2.

Contact members 54A and 54B, at the opposite end of base 21 (FIG. 1), are of the same construction and are mounted in contact cavities 52A and 52B in the same member as described above for contact members 53A and 53B and their cavities 51A and 51B. Accordingly, no detailed illustration of the contact members 54A and 54B is provided in the drawing. The patterns formed by the terminal elements 55A and 55B projecting from base 21, adjacent both end walls 37 and 38 are shown by the patterns for the sockets 63A and 63B in the aligned portion of the mating connector unit 60 in FIG. 2.

Figure 3:
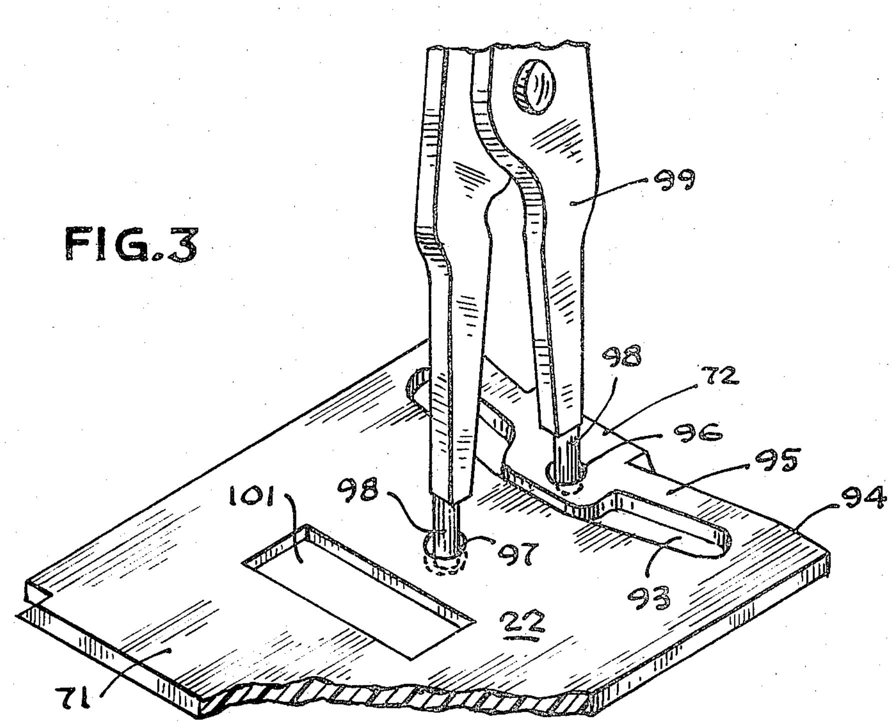
FIG. 3 is a detail isometric view of the cover for the connector unit of FIGS. 1 and 2, illustrating the use of a special tool for assembly and disassembly operations.
Figure 5:
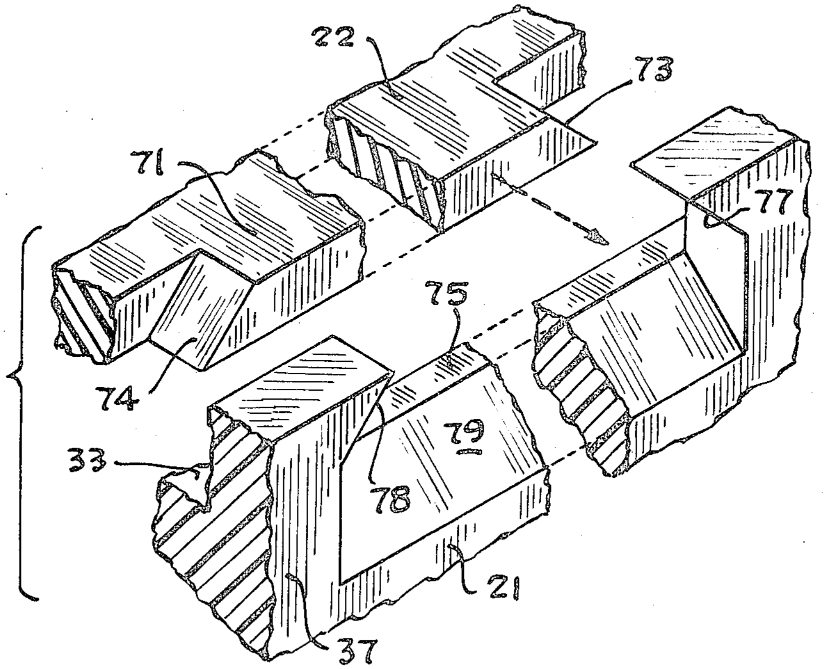
FIG. 5 is a partially sectional detail isometric view, drawn to the same scale as FIG. 4, of the interlock connection between one end of the cover and the base of the connector unit, in disassembled condition.
Figures 6, 7, 8:
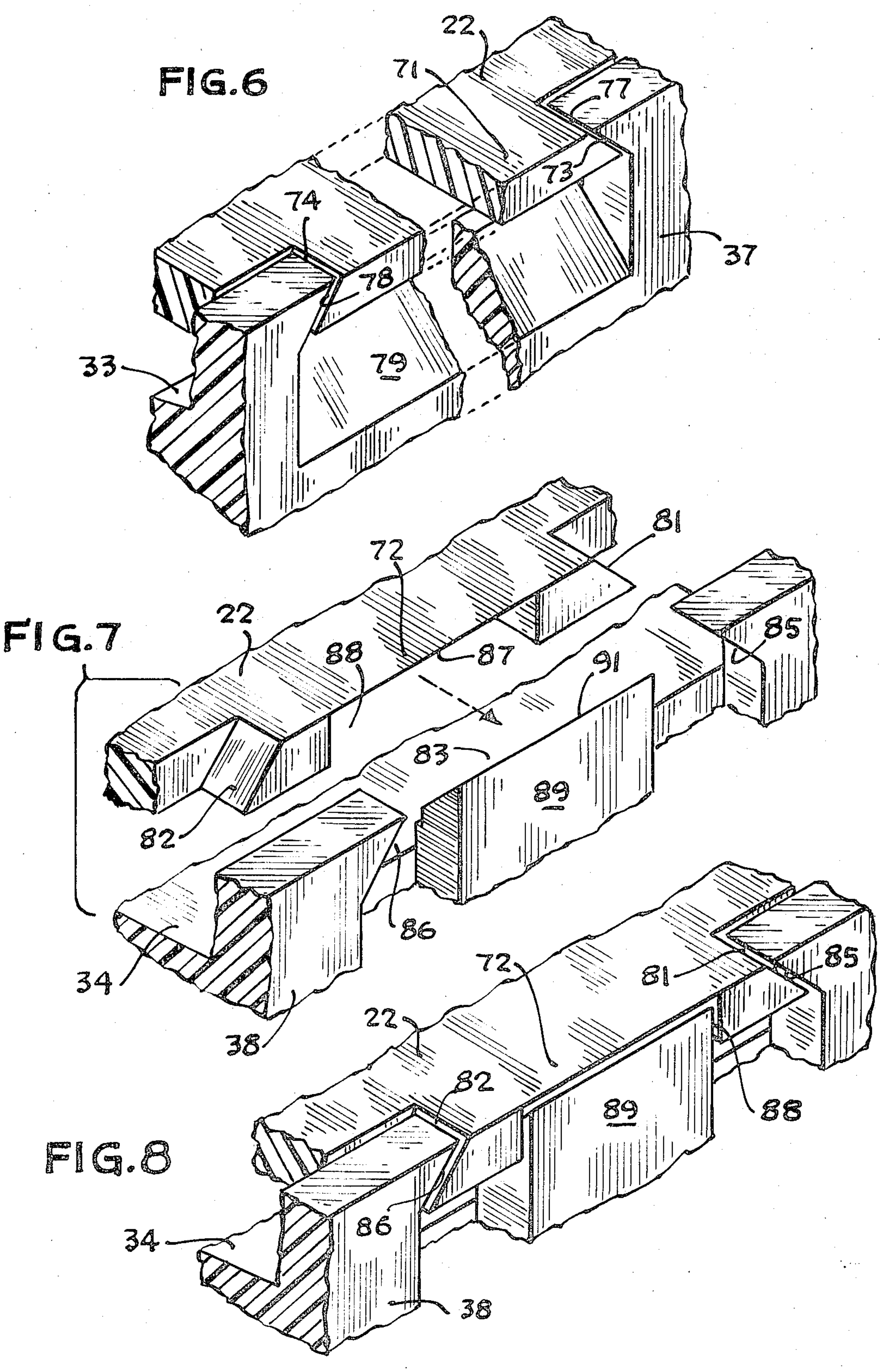
FIG. 6 is a partially sectional detail isometric view showing the interlock of FIG. 5 in assembled condition.
FIG. 7 is a detail isometric view of the cover to base interlock at the opposite end of the connector unit, in disassembled condition.
FIG. 8 is a detail isometric view of the interlock of FIG. 7 in assembled condition.

As shown in FIGS. 1–3, the cover 22 of connector unit 20 includes two key projections 71 and 72 that extend outwardly of opposed ends of the cover. The key projection 71, which extends across most of the length of one end of cover 22, has two upwardly inclined converging positioning surfaces 73 and 74 (FIGS. 1, 5 and 6). The key projection 71 is complementary in configuration to a keyway 75 formed in the upper edge of the end wall 37 of connector base 21. Keyway 75 has two upwardly inclined converging retaining surfaces 77 and 78 that are complimentary to and engageable with the positioning surfaces 73 and 74, respectively, of key projection 71 (FIGS. 5 and 6). The outer part of keyway 75 includes a downwardly sloping guide surface 79 allowing convenient insertion of key 71 into keyway 75 during assembly of connector unit 20, as described more fully hereinafter.

The key projection 72, which is substantially smaller in length than key projection 71, includes two upwardly inclined converging positioning surfaces 81 and 82. Key projection 72 fits into a keyway 3 (FIGS. 7 and 8) formed in the upper edge of wall 38 of base 21. Keyway 83 includes two upwardly inclined converging retaining surfaces 85 and 86 that are complementary to and engageable with the positioning surfaces 81 and 82, respectively, of key projection 72. Key projection 72 is formed with a central recess 88 having a downwardly inwardly inclined upper locating surface 87. A boss 89 on base wall 38 projects up into the central portion of keyway 83 and has an upwardly facing inclined locating surface 91 that is complementary to and engageable with the locating surface 87 on the key 72.

As shown in FIGS. 1–3, an elongated slot 93 is formed in cover 22, slot 93 extending parallel to the end 94 of cover 22 closely adjacent to key projection 72. Slot 93 is located close enough to the end 94 of cover 22 so that the remaining end strip 95, from which key 72 projects, is relatively flexible.

A small blind-end cavity 96 is formed in the end strip 95 adjacent slot 93. The bottom of cavity 96 does not open into the interior of connector base 21. A similar small blind-end cavity 97 is formed in the central portion of cover 22. Cavities 96 and 97 are dimensioned to preclude the insertion of fingers or of ordinary-sized screwdrivers and similar tools into the cavities. Cavities 96 and 97 are specifically constructed to receive the tips 98 of a special pair of pliers 99, as shown in FIG. 3. Cover 22 of connector unit 20 also in includes an aperture 101 for display of the identification legend 29 of circuit device 23 (FIG. 2).

Assembly of connector unit 20 with the integrated circuit device 23, from the condition illustrated in FIG. 1 to that shown in FIG. 2, is accomplished rapidly, conveniently, and accurately in minimal time. At the outset, device 23 is dropped into receptacle 45 in base 21, with the connection surface 27 facing downwardly so that the semiconductor chip 26 is closed within receptacle 45 and the conductive pads 25 each engage the active members 53A, 53B, 54A and 54B in base 21 (FIG. 1). Accurate positioning of circuit device 23 in receptacle 45 is easily accomplished. The inclined guide surfaces 43 and 44 facilitate insertion of circuit device 23 into the base from either side. The inner locating walls 35 and 36, together with side walls 41 and 42, assure accurate positioning of device 23 in predetermined position extending across the top of the open-top receptacle 45.

With circuit device 23 in place in base 21, the key projection 71 on cover 22 is inserted into keyway 75. Key projection 71 may be inserted in keyway 75 at an angle, due to the presence of the inclined outer guide surface 79 (FIGS. 1 and 5). The interlocking connection afforded by key 71 and keyway 75 functions in a manner analogous to a hinge; after key 71 has been inserted into keyway 75, at an angle, the cover may be pivoted downwardly toward the closed position illustrated in FIG. 2.

To complete assembly of connector unit 20, it is necessary to complete an interlock between cover 22 and base 21 at the opposite edge 94 of cover 22 by engaging key projection 72 in the keyway 83 in wall 38. To this end, the tips 98 of assembly tool 99 are inserted into the blind-end cavities 96 and 97 to cover 22 in the manner illustrated in FIG. 3. The pliers 99 are then actuated to bend the end strip 95 of cover 22 inwardly of slot 93, as shown in FIG. 3, to an extent sufficient to enable the outer edge of key 72 to clear the inner surface of base wall 38. With the key projection 72 thus pulled inwardly to its released position, as shown in FIG. 3, the end of cover 22 comprising key 72 is moved downwardly into base 21 and into horizontal alignment with keyway 75 (FIG. 5). The assembly tool 99 is then released, allowing strip 95 to return to its normal position, interlocking key 72 in keyway 83 as shown in FIGS. 2 and 8. During mounting of the cover 22 on base 21, locating walls 35 and 36 (FIG. 1) prevent excessive downward movement of the cover, thus precluding damage to device 23 or contact members 53A and 53B.

With a circuit device having a rectangular substrate 24, as shown in FIG. 1, it would be possible to mount the circuit device 23 in receptacle 45 at a position rotated 180° from the desired alignment. This inaccurate orientation of device 23 in connector unit 20 is undesirable, since the circuit connections for terminal elements 55A and 55B are then incorrect. This orientation error, however, is readily obviated by observation of the identification legend 29 through the opening 101 in cover 22, as illustrated in FIG. 2. If the identification legend is exposed in window 101, the assembler is immediately aware that device 23 is not properly positioned in the connector unit and can promptly correct this condition. Inaccurate orientation of device 23 in connector base 21 is apparent even before cover 22 has been fully locked in place on base 21, and correction can be accomplished quite easily prior to interlocking key 72 with keyway 83. Identification legend 29 may be merely imprinted upon the reverse surface 28 of substrate 24, or may comprise a raised element on the reverse surface of circuit device 23 as shown in FIG. 2.

The procedure followed in disassembling connector unit 20 and removing circuit device 23 is equally simple and expeditious. To disassemble the connector unit the tips of assembly tool 99 are inserted into the blind end cavities 96 and 97 in cover 22. The assembly pliers 99 are then actuated to pull strip of cover 22 inwardly to the position illustrated in FIG. 3, releasing key 72 from the interlocking engagement in keyway 83. When key 73 is clear of keyway 83, cover 22 can be pivoted upwardly and can then be removed from base 21 merely by pulling the cover away from the base to release key 71 from keyway 75.

With connector unit 20 assembled, as described above, and as illustrated in FIG. 20, each of the resilient contact members 53A, 53B, 54A and 54B biases substrate 24 of circuit device 23 upwardly and outwardly of the receptacle 45 in base 21. This upward, outward biasing force is transmitted directly to cover 22, forcing each of the two key projections 71 and 72 of cover upwardly within the mating keyways 75 and 83, respectively, of base 21. As a consequence, the converging inclined positioning surfaces 73 and 74 on key 71 are forced into snug engagement with the mating inclined retaining surfaces 77 and 78, respectively, of keyway 75, as shown in FIG. 6. Similarly, the convergent inclined positioning surfaces 81 and 82 of key 72 are snugly engaged with the complementary inclined retaining surfaces 85 and 86 of keyway 83, as shown in FIG. 8. It is thus seen that the positioning and retaining surfaces of the keys and keyways lock cover 22 firmly in place on base 21 of connector unit 20; moreover, this interlocking construction provides a high degree of accuracy in positioning of cover 22 on base 21.

The utilization of the resilience of the metal contact members in base 21 also makes for a tight assembly of cover 22 on the connector unit base. Because the inclined mating surfaces between the key projections on the cover and the keyways on the base afford both horizontal and vertical control, any tendency toward a loose fit between the cover 22 and the base 21 of connector unit 20 is effectively avoided. The interlocking construction afforded by key 71 and its mating keyway 75 affords the convenience and facility of use of a hinge without requiring a complete hinge structure. The right-angle cantilever construction for the contact members 53A, 53B, 54A and 54B provides an effective bias for substrate 24 and cover 22 with a minimal height requirement. The net result is a connector unit 20 having a low profile and compactness of construction that would otherwise be difficult to duplicate.

A workman with access to an assembly tool such as tool 99 can assemble and disassemble connector unit 20 rapidly and accurately, as described above. On the other hand, unauthorized personnel, not having an assembly tool available, find it quite difficult to tinker with the connector unit. The close tapered fit between the locating surface 91 of boss 89 on base 21 and the mating positioning surface 87 on slot 88 in key 72 also aids in preventing unauthorized access to device 23 in connector unit 20. With the described construction it is virtually impossible to spring key 72 free of keyway 83 with a screwdriver or other generally available tool. Moreover, this protection is achieved without the necessity of forming keyway 83 as a blind-end cavity, so that wall 38 need not be increased in thickness in the area of keyway 83.

I claim:

1. An electrical connector unit for supporting and for completing electrical connections to a leadless circuit device comprising a thin, flat substrate and a plurality of conductive pads arranged in a predetermined pattern on a substantially planar connection surface of that substrate, said connector unit comprising:

an insulator base having walls with upper edges defining an open-top receptacle for receiving and locating said circuit device in predetermined position extending across the top of the receptacle;

a plurality of individual resilient metal contact members mounted in said base, each of said contact members including a terminal element projecting outwardly of said base for connection to an external circuit and an active contact element projecting upwardly into said receptacle, the active contact elements of said contact members being arranged in a pattern providing for contact between said contact members and said conductive pads when said device is positioned in said receptacle;

an insulator cover for closing the top of said receptacle to enclose said device in said receptacle, said cover including two key projections extending outwardly of the opposed ends thereof, each key projection having an upwardly inclined positioning surface, said cover further having an elongated slot extending parallel to one edge of said cover closely adjacent one of said key projections to form, with said one key projection, a releasable latch;

and two keyways, formed in the upper edges of opposed walls of said base above the adjoining inserted device, for receiving said key projections, each keyway having an upwardly inclined retaining surface complementary to and engageable with the positioning surface of one of said key projections;

said key projections including a given key projections with opposite ends and a second inclined surface to form two upwardly inclined converging positioning surfaces at said opposite ends and said keyway for said given key projection includes a second inclined surface to form two upwardly inclined converging retaining surfaces complementary to and engageable with the positioning surfaces of said given key projection;

said resilient contact members biasing said device and said cover upwardly outwardly of said receptacle, when said connector unit is assembled with said circuit device inserted in said receptacle and said cover mounted on said base with said key projections extending into said keyways, to force the inclined positioning surfaces of said key projections into snug engagement with the inclined retaining surfaces of said keyways and thereby lock said cover and said device firmly in said base.

2. An electrical connector unit according to claim 1, in which each key projection has two upwardly inclined converging positioning surfaces at the opposite ends thereof, and in which each keyway has two upwardly inclined converging retaining surfaces complementary to and engageable with the positioning surfaces of one of said key projections.

3. An electrical connector unit, according to claim 2, in which said one key projection and its mating keyway are much shorter in length than the length of the base wall in which said mating keyway for said one key projection is formed, and in which the other key projection and its mating keyway extend for a major portion of the length of the base wall in which said mating keyway for said other key projection is formed.

4. An electrical connector unit, according to claim 2, in which the central portion of said one key projection has a recess formed therein having a downwardly inwardly inclined locating surface, and in which the base wall containing the keyway for said one key projection includes a central boss projecting upwardly into said recess and having an inclined locating surface complementary to said locating surface in said recess.

5. An electrical connector unit, according to claim 1, in which each of said metal contact members includes a cantilever spring arm extending in spaced relation to said substrate connection surface, the fixed end of said cantilever spring arm comprising an integral extension anchored to and projecting outwardly of said base to afford said terminal element, and the free end of said spring arm comprising an integral extension forming said active contact element.

6. An electrical connector unit, according to claim 1, and further comprising latch release means including two recesses formed in said cover, one on each side of said slot, of a size small enough to preclude access by human fingers but affording access to small-tipped assembly pliers.

7. An electrical connector unit, according to claim 1, in which said base further includes internal locating means limiting downward movement of said cover into said base and thereby precluding damage to said circuit device or said contact members when said cover is mounted on said base.

8. An electrical connector unit, according to claim 7, in which said internal locating means comprises two internal locating walls, within said base, spaced from said two opposed walls incorporating said keyways, said internal locating walls defining two sides of said receptacle.

9. An electrical connector unit, according to claim 1, in which two opposed walls of said base, other than the walls incorporating said keyways, are each provided with a downwardly inwardly inclined guide surface for guiding said circuit device into said predetermined position over said receptacle.

10. An electrical connector unit, according to claim 1, in which the top surface of said cover is essentially coplanar with the top edges of the walls of said base when said cover is mounted on said base.

11. An electrical connector unit for supporting and for completing electrical connections to a leadless circuit device comprising a thin, flat substrate and a plurality of conductive pads arranged in a predetermined pattern on a substantially planar connection surface of that substrate, said connector unit comprising:

an insulator base including walls with upper edges defining an open-top receptacle for receiving said circuit device and locating said device in predetermined position in the receptacle and slightly below the upper edges of the walls;

a plurality of individual resilient metal contact members mounted in said base, said contact members each including a terminal element projecting outwardly of said base for connection to external circuit elements and an active contact element projecting upwardly into said receptacle, said contact members being arranged in a pattern providing for contact between said contact members and said conductive pads when said device is positioned in said receptacle;

an insulator cover for closing the top of the receptacle to enclose said device in said receptacle, said cover including a pair of opposed ends and an elongated slot extending generally parallel to one of said ends and adjacent thereto, forming an inwardly yieldable releasable latching arm;

and said opposed ends and adjacent upper edges of said walls of said base including releasable latching means for locking said cover in said base, said latching means including a key projection extending outwardly of said latching arm, a complementary keyway with an outer boss to limit access thereto formed in the upper edge of the adjacent base wall, and two recesses in said cover, including one of said recesses in said latching arm, of a size small enough to preclude access by human fingers.

12. An electrical connector unit, according to claim 11, in which said key projection and keyway each include a pair of inwardly inclined positioning surfaces oppositely positioned in a direction transverse to the movement of the latching arm and combining with the action of the resilient contacts on the conductive pads to force said surfaces of said key projection into snug engagement with said surfaces of said keyway and thereby lock said cover and said device firmly in said base.

13. An electrical connector unit, according to claim 12, in which said releasable latching means includes a pair of key projections on said opposed ends of said cover and a pair of complementary keyways in said upper edges of said adjacent walls.

14. An electrical connector unit, according to claim 11, in which the top surface of said cover, when said cover is locked in said base, is essentially coplanar with the tops of the outer walls of said base.

15. An electrical connector unit for supporting and for completing electrical connections to a leadless circuit device comprising a thin, flat substrate and a plurality of conductive pads arranged in a predetermined pattern on a substantially planar connection surface of that substrate, said connector unit comprising:

an insulator base having walls with upper edges defining an open-top receptacle for receiving and locating said circuit device in predetermined position extending across the top of the receptacle;

a plurality of individual resilient metal contact members mounted in said base, each of said contact members including a terminal element projecting outwardly of said base for connection to an external circuit and an active contact element projecting upwardly into said receptacle, the active contact elements of said contact members being arranged in a pattern providing for contact between said contact members and said conductive pads when said device is positioned in said receptacle;

an insulator cover for closing the top of said receptacle to enclose said device in said receptacle, said cover including a pair of opposed ends with outer edges and an elongated slot extending generally parallel and closely adjacent to one of said edges of said cover to form a releasable latching arm;

and said opposed ends and upper ends of said walls of said base including releasable latching means for locking said cover in said base, said latching means including a key projection extending outwardly of said latching arm and a complementary keyway formed in the upper edge of the wall adjacent said latch with limited outward access to said key projection through said wall, said key projection having opposite ends and two upwardly inclined converging positioning surfaces at said ends and said keyway having two upwardly inclined converging retaining surfaces complementary to and engageable with the positioning surfaces of said key projection;

said resilient contact members biasing said device and said cover upwardly outwardly of said receptacle, when said connector unit is assembled with said circuit device inserted in said receptacle and said cover mounted on said base with said key projection extending into said keyway, to force the inclined positioning surfaces of said key projection into snug engagement with the inclined retaining surfaces of said keyway and thereby lock said cover and said device firmly in said base.

16. An electrical connector unit, according to claim 15 and further comprising latch release means including a recess formed in the latching arm and of a size small enough to preclude access by human fingers for release of said latch.

* * * * *

UNITED STATES PATENT OFFICE

CERTIFICATE OF CORRECTION

PATENT NO. : 3,846,737

DATED : November 5, 1974

INVENTOR(S) : Tedford H. Spaulding

It is certified that error appears in the above-identified patent and that said Letters Patent are hereby corrected as shown below:

Column 3, line 11, change "comple mentary" to -complementary-.

Column 5, line 54, change "found" to -formed-.

Column 6, line 61, change "3" to -83-.

Column 7, line 30, change "closed" to -enclosed-; line 56, change "to" to -of-.

Column 9, line 64, change "projections" (second occurrence) to -projection-.

Column 12, line 31, change "ends" (second occurrence) to -edges-.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*